United States Patent [19]

Nemoto et al.

[11] Patent Number: 4,548,889

[45] Date of Patent: Oct. 22, 1985

[54] OPTICAL RECORDING MEDIUM

[75] Inventors: Yuhei Nemoto, Tokyo; Sadaaki Shigeta, Narashino; Yoshio Yokokawa, Tokyo, all of Japan

[73] Assignee: Dainippon Ink and Chemicals, Inc., Tokyo, Japan

[21] Appl. No.: 715,758

[22] Filed: Mar. 25, 1985

Related U.S. Application Data

[63] Continuation of Ser. No. 456,809, Jan. 10, 1983, abandoned.

[30] Foreign Application Priority Data

Jan. 12, 1982 [JP] Japan .................................. 57-2309

[51] Int. Cl.$^4$ .............................................. G03C 5/24
[52] U.S. Cl. .................................... 430/273; 430/271; 430/495; 430/945; 430/523; 346/135.1; 346/76 L
[58] Field of Search ............... 430/945, 271, 273, 524, 430/495, 523; 346/135.1, 76 L; 428/469

[56] References Cited

U.S. PATENT DOCUMENTS 3,902,180  8/1975  Sobajima et al. ................. 346/76 L
4,188,214  2/1980  Kido et al. ......................... 430/495
4,268,575  5/1981  Shinozaki et al. ................ 346/76 L

OTHER PUBLICATIONS

Bert Phillips & Luke L. Y. Chang, Transactions of the Metallurgical Society of AIME, vol. 233, Jul. 1965, pp. 1433–1436.
S. K. Deb and J. A. Chopporian, Journal of Applied Physics, vol. 37, No. 13, 1966, pp. 4183–4825.
C. R. Bamford, "A Theoretical Analysis of the Optical Properties of Spectrafloat Glass", Physics and Ehcmistry of Glasses, vol. 17, No. 6, Dec. 1976, pp. 209–213.
S. K. Deb, Philosophical Magazine, vol. 27, 1973, pp. 801–822.

*Primary Examiner*—Won H. Louie
*Attorney, Agent, or Firm*—Sherman & Shalloway

[57] ABSTRACT

An optical recording medium composed of an energy-absorbing layer having a high energy absorption with respect to light having a wavelength of 750 to 850 nm, the energy-absorbing layer being a film composed of a matrix of a metal oxide and fine particles of a metal dispersed in the matrix, and an energy-sensitive layer which is a film or sheet of an organic material in contact with at least one surface of the energy-absorbing layer.

14 Claims, 5 Drawing Figures

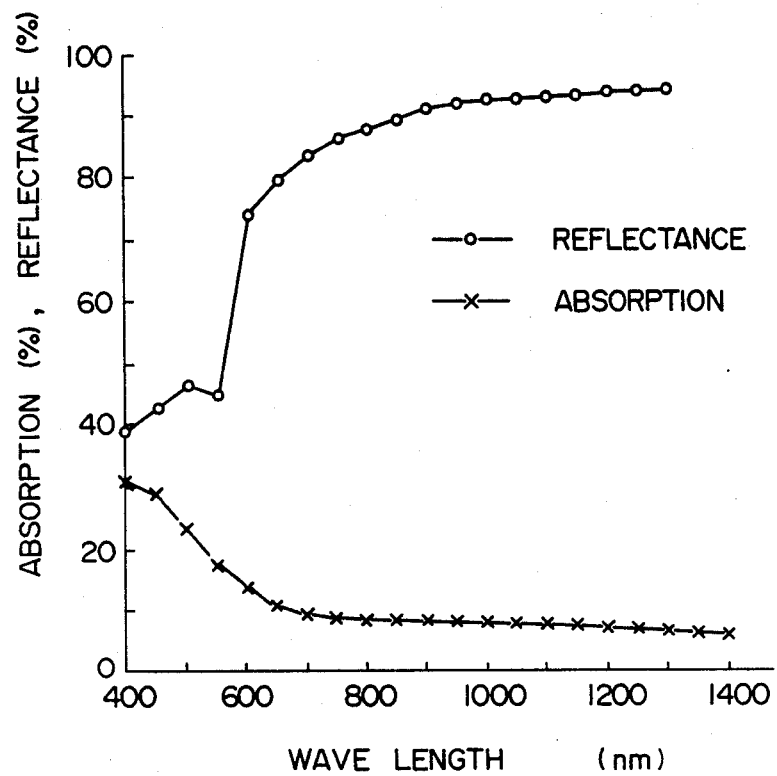

OPTICAL RECORDING MEDIUM

This application is a continuation of application Ser. No. 456,809, filed Jan. 10, 1983, abandoned.

This invention relates to a recording medium suitable for recording and playback of information by utilizing the fact that upon irradiation of energy beams such as laser light, the irradiated part changes in optical properties such as reflectance and transmittance.

Optical recording media such as an optical disk are required to have high recording sensitivity within the wavelength region of the laser used as a recording light source, a high SN ratio of playback signals and in a playback mode utilizing reflected light as in the optical disk, such as a reflectance as to enable playback of reflected light. In addition, it is important that they should be non-toxic. On the other hand, the use of a diode laser is desired as a recording light source because of its small size, light weight, high efficiency, direct modulability and low cost. In view of its high focusing property, the spectral sensitivity of a photosensitive material, and the convenience of use, the diode laser desirably has a wavelength in the visible region, but presently the shortest wavelength of the diode laser length is 750 to 850 nm. Moreover, the output of the diode laser is usually less than 20 mW. For this reason, recording media for diode lasers are required to have high spectral sensitivity particularly at 750 nm to 850 nm.

A medium composed of a glass or plastic substrate and a film of tellurium or a film of tellurium-arsenic alloy formed on the substrate is now considered to be the best diode laser recording medium. This is a so-called heat mode recording medium in which a rise in temperature at a part irradiated with laser light causes melting of tellurium and thus formation of pits. Tellurium and the tellurium-arsenic alloy have a high light absorption in a wavelength region of 750 nm to 850 nm, a low thermal conductivity and a low melting point as well as a suitable reflectance within this wavelength region which enables playback by reflected light. These properties are quite suitable for laser recording media. The tellurium film and the tellurium-arsenic alloy film, however, have the defect of low stability to oxidation and high toxicity, and these defects limit their commercial acceptance.

Bismuth and antimony films have been studied as materials having similar properties to tellurium. But they have the same toxicity problem as the tellurium-type films, and are inferior to tellurium in regard to recording sensitivity and SN ratio. Attempts have been made to improve oxidation stability by adding selenium to tellurium-arsenic alloy or by using a lower oxide of tellurium, but no effective measure has been found with regard to toxicity.

There has been proposed a recording medium composed of a glass or plastic substrate and formed on the substrate, a dye layer or a layer of a polymer having a dye dispersed therein, which is advantageous over tellurium, tellurium-arsenic alloy, bismuth and antimony in regard to toxicity. Since, however, the absorption wavelength of dyes is generally shorter than red light and a stable dye cannot be obtained which exhibits a high absorption at 750 to 850 nm, i.e. the wavelength range of diode laser emission, no practical dye recording medium suitable for a diode laser as a recording light source has been obtained to date.

The present inventors noted the theory of Maxwell Garnett [J. C. Maxwell Garnett, Philos. Trans. R. Soc. London, Ser. A 203, 385 (1904), 205, 239 (1906)], and thought that in order to control the spectral absorption and spectral reflectance of an optical recording medium, it would be effective to utilize a dielectric-metal composite film composed of a dielectric and fine particles of metal dispersed therein. With this background, the inventors have endeavored to develop an optical recording medium being free from toxicity and having high spectral sensitivity within the wavelength range of diode laser emission, and finally found that an oxide-metal composite film in which a metal is present in the form of fine particles dispersed in a certain kind of metal oxide shows a higher light absorption and reflectance within a wavelength range of 750 to 850 nm and a lower thermal conductivity than ordinary metal films.

Thus, according to this invention, there is provided an optical recording medium composed of an energy-absorbing layer having a high energy absorption with respect to light having a wavelength of 750 to 850 nm, said energy-absorbing layer being a film composed of a matrix of a metal oxide and fine particles of a metal dispersed in said matrix, and an energy-sensitive layer which is a film or sheet of an organic material in contact with at least one surface of the energy-absorbing layer.

With the recording medium of this invention, energy is irradiated onto, and absorbed by, the energy-absorbing layer to generate heat therein, and by the action of the generated heat, the energy-sensitive layer undergoes changes such as deformation, melting, evaporation, sublimation or heat decomposition. As a result, a change occurs in the energy-absorbing layer. Recording and playback are carried out by utilizing changes in optical properties such as light reflectance and transmittance at the energy-irradiated part of the recording medium, which are caused by the aforesaid changes of the energy-sensitive layer. In order, therefore, for the recording medium to have high sensitivity, it is necessary that the energy-absorbing layer should have a high energy absorption, and that the energy absorbed by the absorbing layer and converted to heat should be difficult of dissipating in the horizontal direction of the absorbing layer but easy of transfer to the energy-sensitive layer. In order to meet this need, the energy absorbing layer must have a low thermal conductivity and a small thickness. If the thickness of the energy-absorbing layer is small, the energy irradiated part of this layer has a high energy density, and the recording medium has high sensitivity. In particular, when playback is performed by utilizing reflected light as in an optical disk, it is desirable that the reflectance of the energy-absorbed layer should be high to an extent which does not reduce the required energy absorption.

Various metal oxides can be used in the energy-absorbing layer of the optical recording medium of this invention, but colored molybdenum oxide and colored tungsten oxide are preferred. The colored molybdenum oxide and colored tungsten oxide have an energy absorbing band in a visible to near infrared wavelength range, which absorption band is not seen in $MoO_3$ or $WO_3$. They are usually represented by the chemical formulae $MoO_{3-x}$, $WO_{3-x}$, $M_xMoO_3$, $M_xWO_3$ and $M_xMo_{1-y}M_yO_3$ wherein x is a positive number of not more than 0.5, y is a positive number of not more than 1, and M represents a metal element of Group I or II of the periodic table. Those compounds of the above formulae in which x is about 0.1 have an increased absorption at a wavelength range of 750 to 850 nm, and are especially suitable for use as the energy-absorbing layer of the recording medium of this invention.

The energy-absorbing layer in the optical recording medium of this invention is a film of the aforesaid colored molybdenum oxide or colored tungsten oxide matrix in which fine discrete particles having a particle size of less than several hundred Å are dispersed. Since the colored molybdenum oxide or the colored tungsten oxide has a low thermal conductivity and the fine metal particles are isolated from each other, the thermal conductivity of the energy-absorbing layer is much lower than a continuous film of the metal. As a result of the fine metal particles being dispersed in the matrix of a dielectric such as colored molybdenum oxide or colored tungsten oxide, an unusual absorption band not seen in a continuous film of the metal appears in the visible-near infrared region, as is anticipated from the theory of Maxwell Garnett, and moreover, the absorption has a maximum as a function of the volume fraction of metal particles (see C. R. Bamford, Physics and Chemistry of Glasses, Vol. 17, No. 6, 1976, pages 209–213). Accordingly, even with an energy-absorbing layer having a small thickness, the proper selection of the volume fraction of metal particles causes the dispersed metal particles to contribute to absorption in addition to absorption by the colored molybdenum oxide or colored tungsten oxide, and therefore, imparts a high absorption to the energy-absorbing layer. In particular, copper, silver, gold, etc. have very low absorptions, but a dispersion of particles of these metals in the colored molybdenum oxide or colored tungsten oxide matrix has a high absorption. The reflectance of such a dispersion is lower than the metals, but higher than a dispersion of fine particles of other metals in the aforesaid oxide matrix. Hence, a film of a dispersion of fine particles of copper, silver, gold, etc. in the colored molybdenum oxide or colored tungsten oxide is especially suitable as an energy-absorbing layer when the light recording medium of this invention is used in an optical disk, etc. which performs playback utilizing reflected light.

The absorption spectrum of the energy-absorbing layer varies depending upon the composition of the colored molybdenum oxide or the colored tungsten oxide and the kind and the volume fraction of the metal dispersed in the oxide matrix. By selecting these conditions, it is possible to obtain a recording medium most suited for the laser used for recording. The metal used in the energy-absorbing layer is not limited to a single kind, but in order to adjust the absorption spectrum of the energy-absorbing layer, a mixture or alloy of at least two metals may be used.

Desirably, the energy absorption of the energy-absorbing layer is at least 20% at the wavelength of an energy beam used. If the absorption is less than 20%, it is difficult to obtain a recording medium having high sensitivity. In the case of recording media adapted for playback by reflected light, the energy-absorbing layer desirably has a reflectance of at least 20%. For use in recording media of other types, the the reflectance of the energy-absorbing layer may be less than 20%. Furthermore, energy-absorbing layers having an absorption of less than 20% may be feasible when a high output energy is used.

The volume fraction of metal in the energy-absorbing layer is desirably at least 0.1 but not more than 0.9. If the volume fraction is less than 0.1, the thickness of the energy-absorbing layer must be increased in order to increase its absorption, and consequently, the energy density of the energy beam-irradiated part of the recording medium becomes low, and the recording sensitivity of the recording medium decreases. If the volume fraction of the metal exceeds 0.9, the metal particles in the absorbing layer contact each other to decrease its energy absorption and increase its thermal conductivity, thus resulting in a reduction in recording sensitivity. In particular, when the optical recording medium of this invention is used in an optical disk, etc. adapted for playback by reflected light, the light reflectance of the energy-absorbing layer must be increased, and for this purpose, the volume fraction of the metal particles is desirably within the range of 0.2 to 0.9.

Desirably, the energy-absorbing layer in the recording medium of this invention has a thickness of not more than $10^4$ Å. If the thickness exceeds $10^4$ Å, the volume of the energy irradiated part of the recording medium becomes large and therefore the density of the energy absorbed decreases and the absorbed energy is not easily transferred to the energy-sensitive layer. This eventually causes a reduction in the sensitivity of the recording medium.

The energy-absorbing layer in the optical recording medium of this invention desirably has a sheet resistance of at least 100 ohms/$cm^2$. The thermal conductivity of a metal and its electrical conductivity are correlated by the Wiedemann-Franz law, and if the sheet resistance is below the above-specified value, a recording medium having high sensitivity cannot be obtained because of heat conduction.

It is necessary that the energy-sensitive layer of the optical recording medium of this invention should greatly change in properties at a temperature above a certain critical temperature which lies above room temperature and be stable below the critical temperature, and should have a low thermal conductivity and a low specific heat. Accordingly, the organic material used in the energy-sensitive layer should possess these properties. Most of ordinary organic polymeric materials possess the above properties, and therefore can be used in the energy-sensitive layer in this invention. Organic acids and hydrocarbon compounds, which are solid at room temperature, can also be used as the organic material. Examples of suitable organic materials for the energy-sensitive layer include organic polymeric materials such as nitrocellulose, methylcellulose, gelatin, polymethyl methacrylate, polystyrene, polyvinyl chloride, polyvinylidene chloride, polyacrylonitrile, polyvinyl alcohol, polyethylene, polypropylene, polyacetal, polycarbonate, polyamides, polyethylene terephthalate, polybutylene terephthalate and polyethylene oxide; organic carboxylic acids such as stearic acid, palmitic acid, phthalic acid, succinic acid and abietic acid; and solid paraffin. Among these organic materials, gelatin is especially suitable for the energy-sensitive layer of a recording medium having high sensitivity because of its low melting point. Nitrocellulose undergoes heat decomposition abruptly. Thus, when it is used in the energy-sensitive layer, reflectance and transmittance change greatly below and above the threshold value of the recording energy, and therefore, a recording medium having a high SN ratio can be obtained. Since the polymeric compounds themselves have excellent mechanical properties, the recording medium of this invention can be obtained without any particular need for a substrate when a sheet or film of such a polymeric compound is used as the energy-sensitive layer and the energy-absorbing layer is formed on it. Examples of polymeric compounds used for this purpose include homopolymers of methyl methacrylate, vinyl chloride, vinylidene chloride and styrene, and copolymers containing these monomers as main components, polycarbonate, polyethylene terephthalate, polybutylene terephthalate, polyamides, polyacetal and epoxy resins.

Usually, the optical recording medium of this invention is constructed by forming the energy-sensitive layer and the energy-absorbing layer in contact therewith on a substrate. The substrate may, for example, be a glass plate; or a sheet or film of a thermoplastic or thermosetting resin such as polymethyl methacrylate, polystyrene, polyvinyl chloride, polycarbonate, polyethylene terephthalate, polybutylene terephthalate, polyamides, epoxy resins, diallyl phthalate, diethylene glycolbis-allyl carbonate, polyphenylene sulfide or polyphenylene oxide. In the case of optical disks of the type wherein recording light or playback light is irradiated through the substrate, it is necessary to use a glass plate; or a transparent plastic sheet prepared from a polymer of methyl methacrylate, styrene, vinyl chloride, or diethylene glycol bis-allyl carbonate, a copolymer containing such a monomer as a main component, a polycarbonate or an epoxy resin as the substrate.

The present invention is described in more detail with reference to the accompanying drawings in which:

FIG. 5 shows reflecting and absorption spectra of sample No. 7 (in which the energy absorbing layer is made of a copper film) shown in Example 1 as a comparison.

Figure 1:
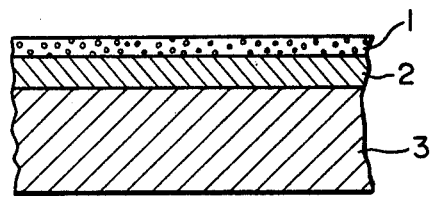
FIGS. 1, 2 and 3 are sectional views showing different embodiments of the optical recording medium of this invention.

A recording medium having the structure shown in FIG. 1 is obtained by forming an energy-sensitive layer 2 on a substrate 3, and then forming an energy-absorbing layer 1. The energy-sensitive layer is formed, for example, by the spin coating, roll coating, dip coating, physical vapor deposition or plasma polymerization of a material for the energy-sensitive layer. The sufficient thickness of the energy-sensitive layer is at least 100 Å. If the thickness of the energy-sensitive layer is less than 100 Å, the difference in light reflectance or transmittance between an energy irradiated part and a non-irradiated part becomes small, and the SN ratio of the playback signal also decreases. Vacuum deposition, sputtering and ion beam techniques, for example, may be used in order to form the energy-absorbing layer on the energy-sensitive layer. Specifically, $MoO_3$ or $WO_3$ and the metal are put in separate crucibles, and heated by means of resistance wires or by subjecting them to irradiation of electron beams under such conditions that the partial pressure of oxygen is not more than $1 \times 10^{-2}$ mmHg. The resulting vapor is deposited. An ion beam method may also be used in which the vapor particles formed in the aforesaid vacuum evaporation step are ionized and accelerated and caused to collide against the energy-sensitive layer to thereby form a thin film. In order to form an energy-absorbing layer composed of a film of a dispersion of metal particles in a matrix of the colored molybdenum oxide or colored tungsten oxide represented by the chemical formulae $M_xMoO_3$, $M_xWO_3$ and $M_xMo_{1-y}M_yO_3$, the following method also may be used. First, the colored molybdenum oxide or the colored tungsten oxide is prepared by mixing a solution of a soluble salt of the metal M and a solution of a soluble molybdenum or tungsten compound and adjusting the pH of the mixture to form a precipitate, or heating the solutions while mixing to dry up the mixture, and thereafter calcining the resulting precipitate or solid. Or a molybdic or tungstic acid salt such as $M_2MoO_4$, $WMoO_4$, $M_2WO_4$ and $MWO_4$ is fully mixed with $MoO_3$ or $WO_3$ in predetermined proportions and then the mixture is calcined. Thereafter, the colored molybdenum oxide or colored tungsten oxide prepared as above and the metal are coevaporated by vacuum evaporation or ion beam techniques.

Alternatively a mixture of a powder of $MoO_3$ or $WO_3$ and a powder of the metal may be subjected to the aforesaid vacuum evaporation or ion plating technique under such conditions that the partial pressure of oxygen is not more than $1 \times 10^{-2}$ mmHg. Or, a mixture of a powder of the colored molybdenum oxide or colored tungsten oxide and a powder of the metal may be subjected to the aforesaid vacuum deposition or ion plating techniques. It is also possible to apply simultaneous sputtering under such conditions that the partial pressure of oxygen is not more than $1 \times 10^{-2}$ mmHg using a target of $MoO_3$ or $WO_3$ and a target of the metal, or apply simultaneous sputtering using a target of the colored molybdenum oxide or the colored tungsten oxide and a target of the metal.

In order to control the absorption and reflectance of the energy-absorbing layer, a method is used in which an optical film thickness monitor capable of measuring the transmittance and reflectance of the film simultaneously is used during film formation, and when the absorption and reflectance reach predetermined values, the film formation is terminated.

Figure 2:
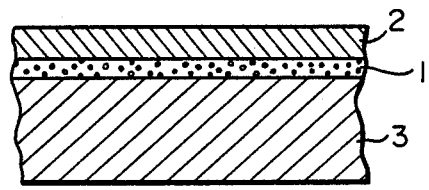

A recording medium having the structure shown in FIG. 2 is obtained by forming an energy absorbing layer 1 on a substrate 3 and then forming an energy-sensitive layer 2.

Figure 3:
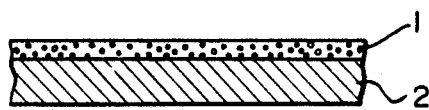

A recording medium having the structure shown in FIG. 3 is obtained by forming an energy-absorbing layer 1 directly on a sheet or film 2 of a polymeric compound which can concurrently serve as an energy-sensitive layer and a substrate.

In the recording media having the structures shown in FIGS. 1 to 3, recording light and playback light may be caused to fall from above or below in these drawings. In a layer structure in which the energy-absorbing layer is exposed to view as in FIGS. 1 and 3, it is desirable to provide a protective layer on the energy-absorbing layer. The protective layer may be made of an inorganic material such as $SiO_2$, $Al_2O_3$ or $TiO_2$, or an organic polymeric material.

The optical recording medium of this invention obtained as above is non-toxic and has high sensitivity. In particular, the recording medium of this invention having an energy-absorbing layer and composed of a film of a dispersion of fine particles of copper, silver or gold in a matrix of colored molybdenum oxide or colored tungsten oxide has a reflectance sufficiently enabling playback by reflected light, and is especially suitable for use as an optical disk.

The following non-limitative examples illustrate the present invention in more detail.

The various measurements in the following examples were made as follows:

The thickness of a film was measured by a multiple-beam interferometry.

The sheet resistance is the resistance of a sample film in ohms/cm$^2$ determined by positioning two vapor deposited electrodes each having a width of 10 mm and a length of 10 mm on the surface of the sample film at the interval of 10 mm and applying a dc voltage across the electrodes.

The light absorption and reflectance indicate spectral absorption and spectral reflectance at a wavelength of 830 nm.

The volume fraction of metal in the energy-absorbing layer is calculated from the following equation after measuring the proportions of the individual elements by applying atomic absorption analysis to a solution of the energy-absorbing layer in an acid or by subjecting the energy-absorbing layer to fluorescent X-ray analysis. Colored molybdenum oxide used was MoO$_3$ (specific gravity 4.50), and the colored tungsten oxide was WO$_3$ (specific gravity 7.16).

$$\text{Volume fraction occupied by the metal particles} = \frac{\text{(Volume of metal)}}{\text{(Volume of colored oxide)} + \text{(Volume of metal)}}$$

EXAMPLE 1

In each run, collodion (a solution of nitrocellulose in ether and alcohol) was coated on a polymethyl methacrylate substrate having a thickness of 1.5 mm by using a spinner, and then dried to form an energy-sensitive layer, 4 μm thick, composed of nitrocellulose. The polymethyl methacrylate substrate having the resulting energy-sensitive layer was mounted in a chamber of a vacuum deposition apparatus. Copper (a product of Furuuchi Chemical Co., Ltd.; granules with a size of 1 to 2 mm, purity 99.99%) and molybdenum trioxide (a product of Furuuchi Chemical Co., Ltd.; tablets with a diameter of 15 mm and a thickness of 5 mm, purity 99.99%) were placed respectively in two crucibles in the vacuum deposition apparatus. At a pressure of 1×10$^{-5}$ mmHg, electron beams were irradiated onto copper and molybdenum trioxide from separate electron guns, and vapors of copper and molybdenum trioxide were deposited onto the substrate while adjusting the rate of evaporation of copper and molybdenum trioxide to form an energy-absorbing layer having the properties shown in Table 1. As a result, an optical recording medium having the structure shown in FIG. 1 was obtained.

Figure 4:
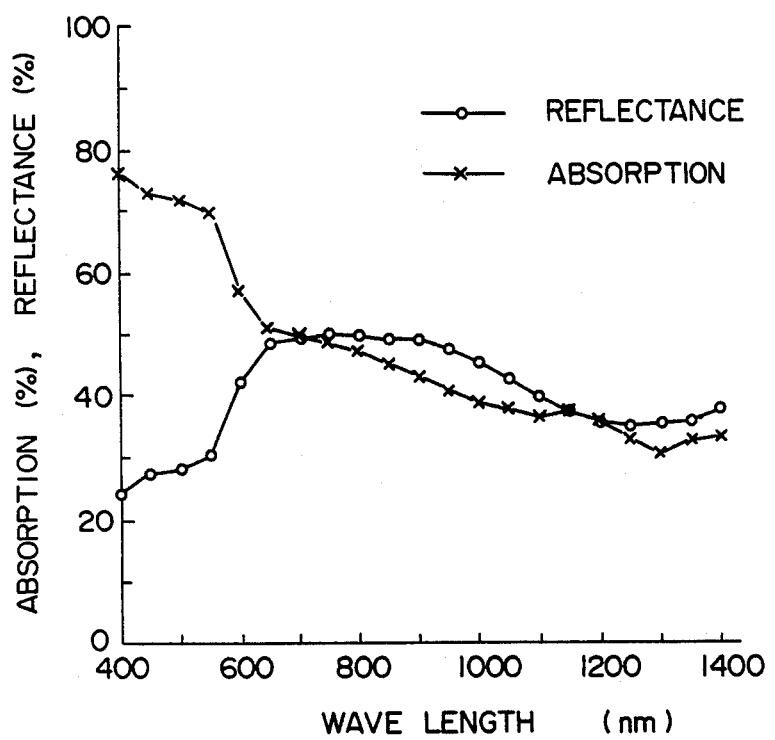
FIG. 4 shows reflecting and absorption spectra of the optical recording medium of this invention (sample No. 5 in Example 1 given hereinbelow)

As shown in Table 1, the absorption of the energy-absorbing layer has a maximum value when the volume fraction of copper is varied. The sheet resistance of samples 2 to 6 are much higher than that (15 ohms/cm$^2$) of sample No. 7. It is clear therefore that the fine particles of copper are dispersed in the energy-absorbing layer. A comparison of FIG. 4 (the reflection and absorption spectra of sample No. 5) with FIG. 5 (the reflection and absorption spectra of the copper film of sample No. 7) shows that while the copper film shows an increase in reflectance with an increase in wavelength above 600 nm, the sample No. 5 has a maximum reflectance in a wavelength region of 700 to 800 nm. This also shows that the fine particles of copper are dispersed in the energy-absorbing layer (see C. R. Bamford, Physics and Chemistry of Glasses, Vol. 17, No. 6, 1976, pages 209–213).

Laser beams (wavelength 839 nm) from a diode laser (Model HLP-1400 made by Hitachi Limited) were focused so that the Airy diameter became 1 μm, and then irradiated onto each of the recording media shown in Table 1. The energy required to reduce the reflectance of the recording medium after laser beam irradiation to one-half or below of that before irradiation at a laser power of 10 mW on the surface of the recording medium was determined by varying the pulse width of the laser beams. The result is shown as a recording energy in Table 1. It is seen from Table 1 that sample No. 1 in which the energy-absorbing layer is composed only of colored molybdenum oxide and sample No. 7 in which the energy-absorbing layer is a copper film show no change in reflectance even when irradiated with laser beam at a laser power of 10 mW with a pulse width of 1 microsecond, whereas with samples Nos. 2 to 6 (the recording media of this invention), recording is possible at a laser power of 10 mW with a pulse width of less than 1 microsecond. In particular, the media of samples Nos. 3 to 5 have very high sensitivity as can be demonstrated by their recording energies of 50 to 180 mJ/cm$^2$. Furthermore, since they have a reflectance of as high as 20 to 54%, they are suitable for use as optical disks adapted for performing playback of signals and focusing and tracking by using reflected light.

TABLE 1

| | | Properties of the energy-absorbing layer | | | | | |
|---|---|---|---|---|---|---|---|
| Sample No. | Volume fraction of copper | Absorption (%) | Reflectance (%) | Thickness (Å) | Sheet resistance (ohms/cm$^2$) | Recording energy (mJ/cm$^2$) | Remarks |
| 1 | 0 | 12 | 3 | 550 | above 10$^6$ | above 1250 | Control |
| 2 | 0.11 | 17 | 6 | 540 | above 10$^6$ | 630 | Invention |
| 3 | 0.20 | 27 | 20 | 520 | above 10$^6$ | 180 | Invention |
| 4 | 0.52 | 49 | 45 | 530 | above 10$^6$ | 50 | Invention |
| 5 | 0.78 | 40 | 54 | 500 | 7 × 10$^5$ | 70 | Invention |
| 6 | 0.90 | 16 | 80 | 520 | 150 | 700 | Invention |
| 7 | 1 | 11 | 85 | 500 | 15 | above 1250 | Control |

EXAMPLE 2

An aqueous solution of reagent-grade gelatin, or a methyl ethyl ketone solution of polymethyl methacrylate, polystyrene, a vinyl chloride (86%)/vinyl acetate (14%) copolymer, or a vinyl chloride (65%)/vinylidene chloride (35%) copolymer was coated on a glass plate having a thickness of 1.5 mm by using a spinner, and dried to form an energy-sensitive layer having a thickness of 6 μm. Then, silver (a product of Furuuchi Chemical Co., Ltd.; granules with a size of 2 to 3 mm, purity of 99.99%) and tungsten trioxide (a product of Furuuchi Chemical Co., Ltd.; tablets with a diameter of 15 mm and a thickness of 5 mm, purity 99.99%) were co-deposited onto the energy-sensitive layer under the same conditions as in Example 1. There were obtained optical recording media having the structure shown in FIG. 1 and the properties shown in Table 2. The properties of the energy-absorbing layers of the resulting recording media and the recording energies of these recording media measured by the same method as in Example 1 are shown in Table 2.

For comparison, a recording medium obtained by forming an energy-absorbing layer directly on the same glass plate (sample No. 13), and a recording medium in which a film of colored tungsten oxide alone was used as the energy-absorbing layer (sample No. 14) were prepared, and the results are also shown in Table 2.

It is seen from Table 2 that the absorptions of the energy-absorbing layers of samples Nos. 8 to 13 are much higher than a continuous film of silver (4.9%) and the colored tungsten oxide film of sample No. 14 (18%), and also show high-sheet resistance values. This fact shows that the energy-absorbing layers of samples Nos. 8 to 13 are of such a structure that silver particles are dispersed in the colored tungsten oxide matrix.

As shown in Table 2, samples Nos. 8 to 12 have very high sensitivity as demonstrated by their recording energies of 60 to 90 $mJ/cm^2$. In contrast, the recording medium free from an energy-sensitive layer and having an energy absorbing layer formed directly on a glass substrate (sample No. 13) showed no change in reflectance even when irradiated with laser beams at a laser power of 10 mW with a pulse width of 1 microsecond, and the recording medium in which the energy-absorbing layer consisted only of colored tungsten oxide (sample No. 14) required a pulse width of 0.8 microsecond at a laser power of 10 mW for recording (recording energy 1010 $mJ/cm^2$). Both samples Nos. 13 and 14 have lower sensitivity than the optical recording media of this invention (samples Nos. 8 to 12).

size of 3 to 5 mm, purity 99.9%) were co-deposited on a polymethyl methacrylate sheet having a thickness of 1.5 mm in the same way as in Example 1 under a pressure of $1 \times 10^{-4}$ mmHg to form an energy-absorbing layer. As a result, a light recording medium having the structure shown in FIG. 3 was obtained (sample No. 15). The properties of the resulting recording medium are shown in Table 3.

EXAMPLE 4

33.5 Parts by weight of ammonium molybdate [$(NH_4)_6Mo_7O_{24}.4H_2O$, reagent-grade made by Wako Pure Chemicals Co., Ltd.] and 2.4 parts by weight of potassium molybdate ($K_2MoO_4$, reagent-grade made by Wako Pure Chemicals Co., Ltd.) were dissolved in 200 parts by weight of deionized water, and the solution was heated with stirring to dry it up. The resulting solid was calcined in an electric furnace at 600° C. for 16 hours to give a blue molybdenum oxide represented by the chemical formula $K_{0.1}MoO_3$.

The resulting colored molybdenum oxide and copper were co-deposited on a polymethyl methacrylate sheet having a thickness of 1.5 mm in the same way as in Example 3 to give a light recording medium having the structure shown in FIG. 3.

The properties of the resulting recording medium (sample No. 16) are shown in Table 3.

EXAMPLE 5

70.6 Parts by weight of ammonium molybdate and 1.5 parts by weight of calcium chloride ($CaCl_2.2H_2O$; reagent-grade made by Wako Pure Chemicals Co., Ltd.) were dissolved in 200 parts by weight of deionized water, and the solution was heated with stirring to dry it up. The resulting solid was calcined in an electric furnace at 600° C. for 16 hours to give a blue molybde-

TABLE 2

| Sample No. | Material for the energy-sensitive layer | Volume fraction of silver | Properties of the energy-absorbing layer | | | | Recording energy ($mJ/cm^2$) | Remarks |
|---|---|---|---|---|---|---|---|---|
| | | | Absorption (%) | Reflectance (%) | Thickness (Å) | Sheet resistance (ohms/$cm^2$) | | |
| 8 | Gelatin | 0.62 | 48 | 49 | 840 | above $10^6$ | 60 | Invention |
| 9 | Polystyrene | 0.60 | 47 | 47 | 810 | above $10^6$ | 70 | Invention |
| 10 | Polymethyl methacrylate | 0.60 | 47 | 46 | 800 | above $10^6$ | 90 | Invention |
| 11 | Vinyl chloride (86%)/vinyl acetate (14%) copolymer | 0.60 | 45 | 48 | 810 | above $10^6$ | 80 | Invention |
| 12 | Vinyl chloride (65%)/vinylidene chloride (35%) copolymer | 0.61 | 49 | 49 | 840 | above $10^6$ | 80 | Invention |
| 13 | None | 0.63 | 44 | 52 | 790 | above $10^6$ | above 1250 | Control |
| 14 | Gelatin | 0.00 | 18 | 8 | 850 | above $10^6$ | 1010 | Control |

EXAMPLE 3

47.5 Parts by weight of tungstic acid ($H_2WO_4$, reagent-grade made by Wako Pure Chemicals Co., Ltd.) and 3.3 parts by weight of sodium tungstate were dissolved in 5,000 parts by weight of deionized water with stirring at an elevated temperature. The solution was further heated with stirring to dry it up. The resulting solid was calcined in an electric furnace at 800° C. for 16 hours to give a blue tungsten oxide represented by the chemical formula $Na_{0.1}WO_3$.

The resulting colored tungsten oxide and tin (a product of Furuuchi Chemical Co., Ltd.; granules with a num oxide represented by the chemical formula $Ca_{0.05}MoO_3$.

The colored molybdenum oxide and lead (a product of Furuuchi Chemical Co., Ltd.; granules with a size of 1 to 2 mm, purity 99.99%) were co-deposited on a polymethyl methacrylate sheet having a thickness of 1.5 mm in the same way as in Example 3 to give a light recording medium having the structure shown in FIG. 3.

The properties of the resulting recording medium (sample No. 17) are shown in Table 3.

EXAMPLE 6

Tungstic acid (50.0 parts by weight) was dissolved under heat in 5,000 parts by weight of deionized water, and then, 2.5 parts by weight of copper sulfate (CuSO$_4$.5H$_2$O; reagent-grade made by Wako Pure Chemicals Co., Ltd.) was dissolved in the resulting solution. The solution was heated with stirring to dry it up. The resulting solid was calcined in an electric furnace at 800° C. for 16 hours to give a blue tungsten oxide represented by the chemical formula Cu$_{0.05}$WO$_3$.

The resulting colored tungsten oxide and gold (a product of Furuuchi Chemical Co., Ltd.; granules with a size of 1 to 3 mm, purity 99.99%) were co-deposited on a polymethyl methacrylate sheet having a thickness of 1.5 mm in the same way as in Example 3 to form an energy-absorbing layer. Collodion was coated on the resulting energy-absorbing layer by means of a spinner, and dried to form an energy-sensitive layer composed of nitrocellulose and having a thickness of 5 μm. Thus, an optical recording medium having the structure shown in FIG. 2 was obtained.

The properties of the resulting optical recording medium (sample No. 18) are shown in Table 3.

TABLE 3

| Sample No. | Type of the energy-absorbing layer | Volume fraction of metal | Properties of the energy-absorbing layer | | | | Recording energy (mJ/cm$^2$) | Remarks |
| | | | Absorption (%) | Reflectance (%) | Thickness (Å) | Sheet resistance (ohms/cm$^2$) | | |
|---|---|---|---|---|---|---|---|---|
| 15 | Na$_{0.1}$WO$_3$—Sn | 0.80 | 67 | 30 | 750 | 2 × 10$^5$ | 60 | Example 3 (invention) |
| 16 | K$_{0.1}$MoO$_3$—Cu | 0.65 | 47 | 48 | 550 | above 10$^6$ | 80 | Example 4 (invention) |
| 17 | Ca$_{0.05}$MoO$_3$—Pb | 0.78 | 52 | 41 | 450 | 6 × 10$^5$ | 60 | Example 5 (invention) |
| 18 | Cu$_{0.05}$WO$_3$—Au | 0.79 | 43 | 49 | 420 | 5 × 10$^4$ | 90 | Example 6 (invention) |

What is claimed is:

1. An optical recording medium composed of a substrate, an energy-sensitive layer which is a film or sheet of an organic material formed on one surface of the substrate, and an energy-absorbing layer formed on the surface of the energy-sensitive layer and having a high energy absorption with respect to light having a wavelength of 750 to 850 nm, said-absorbing layer being a film composed of a matrix of a metal oxide and fine particles of a metal dispersed in said matrix, said metal oxide being at least one compound selected from the group consisting of MoO$_{3-x}$, WO$_{3-x}$, M$_x$MoO$_3$, M$_x$WO$_3$ and M$_x$Mo$_{1-y}$W$_y$O$_3$ wherein x is a positive number of not more than 0.5, y is a positive number of not more than 1, and M represents a metal element of Group I or II of the periodic table, said metal being at least one of copper, silver and gold, and the volume fraction of the fine metal particles in the energy-absorbing layer being from 0.2 to 0.8.

2. An optical recording medium according to claim 1 wherein the energy-absorbing layer has a thickness of not more than 10$^4$ Å.

3. An optical recording medium according to claim 1 wherein the energy-absorbing layer has a sheet resistance of at least 100 ohms/cm$^2$.

4. An optical recording medium according to claim 1 wherein the energy-sensitive layer is a film or sheet of an organic polymeric material selected from the group consisting of nitrocellulose, methylcellulose, gelatin, polymethyl methacrylate, polystyrene, polyvinyl chloride, polyvinylidene chloride, polyacrylonitrile, polyvinyl alcohol, polyethylene, polypropylene, polyacetal, polycarbonate, polyamides, polyethylene terephthalate, polybutylene terephthalate and polyethylene oxide.

5. An optical recording medium according to claim 4 wherein the organic polymeric material is gelatin.

6. An optical recording medium according to claim 1 wherein the energy-sensitive layer has a thickness of at least 100 Å.

7. An optical recording medium according to claim 1 wherein the energy-absorbing layer has a sheet resistance of at least 5 × 10$^4$ ohms/cm$^2$.

8. An optical recording medium according to claim 1 wherein the organic material is nitrocellulose, gelatin, polymethyl methacrylate, polystyrene, vinyl chloride-vinyl acetate copolymer or vinyl chloride-vinylidene chloride copolymer.

9. An optical recording medium according to claim 1 wherein x is about 0.1.

10. An optical recording medium according to claim 1 wherein the energy-sensitive layer comprises nitrocellulose and wherein the energy-absorbing layer is composed of a matrix of molybdenum trioxide and fine particles of copper dispersed in the matrix, said energy-absorbing layer being formed by vacuum depositing vapors of copper and molybdenum trioxide onto the energy-sensitive layer, said energy-absorbing layer having a light absorption at a wavelength of 830 nm of from about 27 to 49%, a light reflectance at a wavelength of 830 nm of from about 20 to 54%, a sheet resistance of at least about 7 × 10$^5$ ohms/cm$^2$, and a recording energy in the range of from about 50 to 180 mJ/cm$^2$.

11. An optical recording medium according to claim 10 which comprises a polymethylmethacrylate substrate having a thickness of about 1.5 mm, a coating of from about 4 microns thickness of said energy-sensitive layer on said substrate, and said energy-absorbing layer vacuum deposited on said energy-sensitive layer having a thickness of from about 500 to about 530 Å.

12. An optical recording medium according to claim 1 wherein the energy-sensitive layer is formed from a material selected from the group consisting of gelatin, polymethylmethacrylate, polystyrene, vinyl chloride/vinyl acetate copolymer, and vinyl chloride/vinylidene chloride copolymer, and wherein the energy-absorbing layer is composed of a vacuum deposited layer of fine particles of silver dispersed on a matrix of tungsten trioxide, wherein the volume fraction of the silver particles in the energy-absorbing layer is about 0.6, said energy-absorbing layer having an absorption of light of wavelength 830 nm of about 45 to 49%, a reflectance of light of wavelength of 830 nm of about 46 to 49%, a sheet resistance of at least about $10^6$ ohms/cm$^2$ and a recording energy of about 60 to 90 mJ/cm$^2$.

13. An optical recording medium according to claim 12 which comprises a glass substrate coated with said energy-sensitive layer to a thickness of about 6 microns, and said energy-absorbing layer having a thickness of about 800 to about 840 Å vacuum deposited on said energy-sensitive layer.

14. An optical recording medium according to claim 1 wherein the metal oxide forming the matrix of said energy-absorbing layer is selected from the group consisting of $Na_{0.1}WO_3$, $K_{0.1}MoO_3$, $Ca_{0.05}MoO_3$, and $Cu_{0.05}WO_3$.

* * * * *